US010123366B2

(12) United States Patent
Park et al.

(10) Patent No.: US 10,123,366 B2
(45) Date of Patent: *Nov. 6, 2018

(54) WIRELESS CONNECTION METHOD, MACHINE-READABLE STORAGE MEDIUM AND ELECTRONIC DEVICE USING OUT-OF-BAND CHANNEL

(71) Applicant: Samsung Electronics Co., Ltd., Suwon-si, Gyeonggi-do (KR)

(72) Inventors: Kyong-Ha Park, Suwon-si (KR); Sergey Zhidkov, Izhevsk (RU); Hyun-Su Hong, Seongnam-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,964

(22) Filed: Sep. 28, 2017

(65) Prior Publication Data
US 2018/0020491 A1  Jan. 18, 2018

Related U.S. Application Data

(63) Continuation of application No. 14/259,545, filed on Apr. 23, 2014, now Pat. No. 9,788,350.

(30) Foreign Application Priority Data

Apr. 24, 2013 (KR) .................. 10-2013-0045520

(51) Int. Cl.
*H04W 76/10* (2018.01)
*H04W 4/80* (2018.01)

(52) U.S. Cl.
CPC ............. *H04W 76/10* (2018.02); *H04W 4/80* (2018.02); *H05K 999/99* (2013.01)

(58) Field of Classification Search
USPC ............................................... 455/41.1, 41.2
See application file for complete search history.

(56) References Cited

U.S. PATENT DOCUMENTS

| 9,788,350 | B2 * | 10/2017 | Park | ................ | H04W 76/02 |
| 2006/0251256 | A1 * | 11/2006 | Asokan | ............. | H04L 63/065 380/270 |
| 2007/0177554 | A1 | 8/2007 | Yang et al. | | |

(Continued)

OTHER PUBLICATIONS

Bluetooth Special Interest Group, "Bluetooth Secure Simple Pairing Using SFC," NFCForum-AD-BTSSP_1.0, Oct. 18, 2011, pp. 1-32.

(Continued)

*Primary Examiner* — Edward Urban
*Assistant Examiner* — Ralph H Justus
(74) *Attorney, Agent, or Firm* — Jefferson IP Law, LLP

(57) ABSTRACT

A wireless connection method between a plurality of electronic devices using an out of band channel is provided. The wireless connection method includes receiving a first hash value through the out of band channel, receiving device identification information of electronic devices in proximity to an electronic device through a main wireless channel, calculating hash values of the device identification information, and performing a wireless connection of the electronic device with a surrounding electronic device that has the hash value identical to the first hash value among the calculated hash values.

20 Claims, 8 Drawing Sheets

(56) References Cited

U.S. PATENT DOCUMENTS

| | | | |
|---|---|---|---|
| 2009/0227282 A1* | 9/2009 | Miyabayashi | H04L 63/0492 455/552.1 |
| 2011/0237193 A1* | 9/2011 | Shen | G06F 1/1694 455/41.2 |
| 2012/0100803 A1 | 4/2012 | Suumäki et al. | |
| 2012/0331526 A1* | 12/2012 | Caudle | G06F 21/6209 726/4 |
| 2013/0029596 A1* | 1/2013 | Preston | H04W 8/005 455/41.1 |
| 2013/0029597 A1* | 1/2013 | Liu | H04W 12/06 455/41.1 |
| 2013/0324046 A1* | 12/2013 | Xue | H04M 1/7253 455/41.2 |
| 2014/0075523 A1* | 3/2014 | Tuomaala | H04L 63/083 726/6 |
| 2014/0187149 A1* | 7/2014 | Lortz | H04W 4/008 455/41.1 |

OTHER PUBLICATIONS

Nokia Developer Wiki, "Write and read Bluetooth NDEF tag," http://www.developer.nokia.com/Community/Wiki/Write_and_read_Bluetooth_NDEF_tag, Aug. 27, 2007.

Wi-Fi Alliance, "Wi-Fi Protected Setup Specification," Dec. 2006, pp. 1-110, Version 1.0h.

IEEE Micro, "A tutorial on CRC Specification," Aug. 1998, pp. 1-14.

Peter K. Pearson, "Fast Hashing of Variable-Length Text Strings," Communications of the ACM, Jun. 1990, pp. 677-680, vol. 33, No. 6.

\* cited by examiner

WIRELESS CONNECTION METHOD, MACHINE-READABLE STORAGE MEDIUM AND ELECTRONIC DEVICE USING OUT-OF-BAND CHANNEL

CROSS-REFERENCE TO RELATED APPLICATION(S)

This application is a continuation application of prior application Ser. No. 14/259,545, filed on Apr. 23, 2014, which claimed the benefit under 35 U.S.C. § 119(a) of a Korean patent application filed on Apr. 24, 2013 in the Korean Intellectual Property Office and assigned Serial number 10-2013-0045520, the entire disclosure of each of which is hereby incorporated by reference.

TECHNICAL FIELD

The present disclosure relates to a communication method between electronic devices. More particularly, the present disclosure relates to a wireless connection method between electronic devices.

BACKGROUND

Most electronic devices transmit and receive content data to and from other electronic devices through a wireless interface. For example, such a wireless interface includes a Wireless Fidelity (WiFi), a WiFi-Direct, a Near Field Communication (NFC), and the like.

One issue that affects the use of the wireless interface is that a setting up of a wireless communication link is complex. Further, a conventional wireless connection method has inconvenience in use because a corresponding communication module has to be manually activated.

Meanwhile, when an out of band channel is used, a wireless connection procedure can be simplified in comparison with the above-mentioned general wireless interfaces.

Device identification information should be stored in order to wirelessly connect electronic devices with one another, which includes a network address of 48 bits, a device identifier of 8~258 bits, an authorization information/encryption type of 2~4 bits, and authorization information of 14-256 bits. Therefore, entire capacity of the out of band channel must be 72-564 bits.

However, the out of band channel has a problem in that a data rate is slow and a small amount of data is transmitted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

An aspect of the present disclosure is to provide a method of rapidly and simply establishing a wireless connection procedure using an out of band channel with low capacity.

In accordance with an aspect of the present disclosure, a wireless connection method between plural electronic devices using an out of band channel is provided. The wireless connection method includes receiving, by an electronic device, a first hash value through the out of band channel, receiving, by the electronic device, device identification information of surrounding electronic devices in proximity to the electronic device through a main wireless channel, calculating, by the electronic device, hash values of the device identification information, and performing, by the electronic device, a wireless connection with one of the surrounding electronic devices corresponding to the hash value identical to the first hash value among the calculated hash values.

In accordance with another aspect of the present disclosure, an electronic device using an out of band channel is provided. The electronic device includes a communication unit configured to communicate with surrounding electronic devices, a storage unit configured to store data, and a controller configured to receive and store a first hash value through the out of band channel provided by the communication unit, to receive second device identification information of a surrounding electronic device through a main wireless channel provided by the communication unit, to calculate a second hash value based on the second device identification information, and to perform a wireless connection with the surrounding electronic device through the main wireless channel if the second hash value is identical to the first hash value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
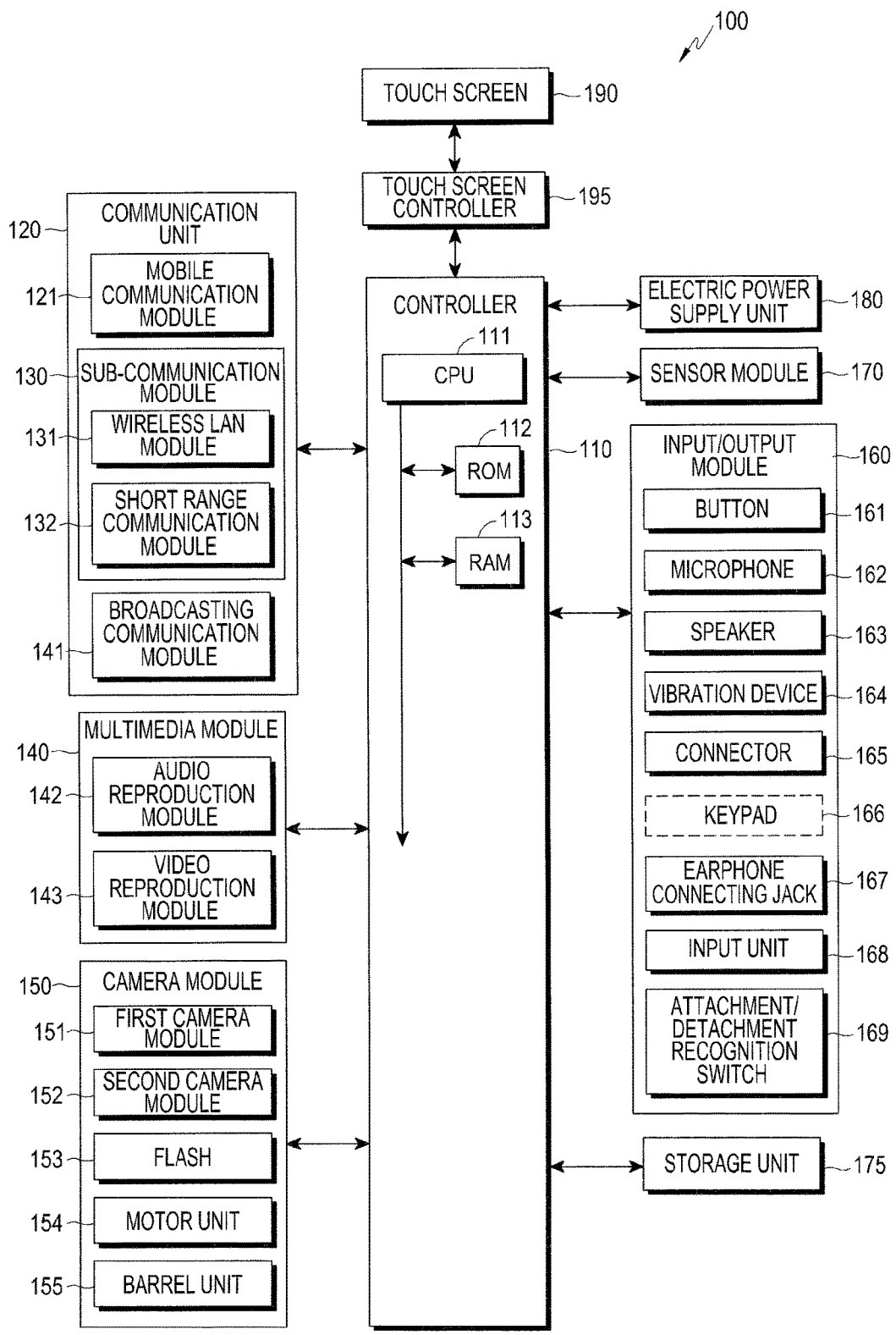
FIG. 1 is a block diagram illustrating a first electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used in this application is for the purpose of describing particular embodiments only and is not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device of the present disclosure may be a certain device, and may be referred to as a portable device, a mobile terminal, a communication terminal, a portable communication terminal, a portable and mobile terminal and so on.

For example, the electronic device may be a smartphone, a portable phone, a game player, a Television (TV), a display unit, a heads-up display unit for a vehicle, a notebook computer, a laptop computer, a tablet Personal Computer (PC), a Personal Media Player (PMP), a Personal Digital Assistant (PDA), or the like. The electronic device may be implemented as a portable communication terminal which has a wireless communication function and a size suitable for placement in a user's pocket. Further, the electronic device may be a flexible device or a flexible display unit.

A representative structure of the electronic device refers to a portable device, and some structural elements of the representative structure of the electronic device may be omitted or changed if necessary.

FIG. 1 is a block diagram illustrating a first electronic device according to a preferred embodiment of the present disclosure.

Referring to FIG. 1, the first electronic device 100 may be connected with an external electronic device (not shown) by using at least one of a communication unit 120, a connector 165, and an earphone connecting jack 167. The external device includes one of various devices attached to or detached from the first electronic device 100 and connected to the first electronic device 100 through a wired cable, such as an earphone, an external speaker, a Universal Serial Bus (USB) memory, a charger, a cradle/dock, a Digital Multimedia Broadcasting (DMB) antenna, a mobile payment device, a health care device (blood-sugar meter or the like), a game player, a navigation device for a vehicle, and the like. Further, an external electronic device may include a Bluetooth communication device, a Near Field Communication (NFC) device, a Wireless Fidelity (WiFi) Direct communication device, and a wireless Access Point (AP) which can be wirelessly connected. In addition, the first electronic device 100 may be connected through a wired cable or radio with another portable terminal or another electronic device, for example, one of a mobile phone, a smart phone, a tablet PC, a desktop PC, and a server.

Referring to FIG. 1, an example of the first electronic device 100 includes at least one touch screen 190 and at least one touch screen controller 195. Further, the first electronic device 100 may include a controller 110, a communication unit 120, a multimedia module 140, a camera module 150, an input/output module 160, a sensor module 170, a storage unit 175 and an electric power supply unit 180.

The communication unit 120 includes a mobile communication module 121, a sub-communication module 130 and a broadcasting communication module 141.

The sub-communication module 130 includes at least one of a wireless Local Area Network (LAN) module 131 and a short range communication module 132, and the multimedia module 140 includes at least one of an audio reproduction module 142 and a video reproduction module 143. The camera module 150 includes at least one of a first camera 151 and a second camera 152. Further, the camera module 150 of the first electronic device 100 according to the present disclosure includes at least one of a barrel 155 for zooming in/zooming out the first and/or second cameras 151 and 152, a motor 154 for controlling a motion of the barrel 155 to zoom in/zoom out the barrel 155, and a flash 153 for providing a light for photographing. The input/output module 160 includes at least one of a button 161, a microphone 162, a speaker 163, a vibration device 164, a connector 165, and a keypad 166.

The controller 110 may include a Central Processing Unit (CPU) 111, a Read Only Memory (ROM) 112 in which a control program for a control of the first electronic device 100 is stored, and a Random Access Memory (RAM) 113 which stores signals or data input from outside of the first electronic device 100, or is used as a storage region for operations performed by the first electronic device 100. The CPU 111 includes any suitable number of processing cores such as a single core CPU, a dual core CPU, a triple core CPU, or a quadruple core CPU. The CPU 111, the ROM 112, and the RAM 113 may be mutually connected to one another through an internal bus.

Further, the controller 110 can control the communication unit 120, the multimedia module 140, the camera module 150, the input/output module 160, the sensor module 170, the storage unit 175, the electric power supply unit 180, the touch screen 190, and the touch screen controller 195.

The controller 110 detects a user input that is provided via an input unit 168 or a touchable user input means such as when a user's finger touches or approaches one object or is located close to the object in a state where a plurality of objects or items are displayed on the touch screen 190, and identifies an object corresponding to a position of the touch screen 190 where the user input is generated. The user input through the touch screen 190 includes one of a direct touch input of directly touching the object and a hovering input which is an indirect touch input of approaching the object within a preset recognition range but not directly touching the object. For example, when the input unit 168 is located close to the touch screen 190, an object located directly under the input unit 168 may be selected. According to the present disclosure, user inputs may also include a gesture input through the camera module 150, a switch/button input through the button 161 or the keypad 166, a voice input through the microphone 162 or the like as well, as the user input through the touch screen 190.

The object or item (or function item) may be displayed on the touch screen 190 of the first electronic device 100. For example, the object or item indicates at least one of an application, a menu, a document, a widget, a picture, a video, an E-mail, a Short Message Service (SMS) message, and a Multimedia Message Service (MMS) message, and may be selected, executed, deleted, canceled, stored, and changed by a user input means. The item may include a button, an icon (or short-cut icon), a thumbnail image, or a folder storing at least one object in the electronic device. Further, the item may be displayed in the form of an image, a text or the like.

The short-cut icon is an image displayed on the touch screen 190 of the first electronic device for rapid execution of each application, a voice call, an address book, a menu or the like which is provided to the first electronic device 100, and executes a corresponding application when an instruction or a selection for the execution of the short-cut icon is input.

Further, the controller 110 can detect a user input event such as a hovering event when the input unit 168 approaches the touch screen 190 or is located proximate to the touch screen 190.

When a user input event is generated according to a preset item or in a preset manner, the controller 110 performs a preset program operation corresponding to the user input event.

The controller 110 can output a control signal to the input unit 168 or the vibration device 164. The control signal includes information related to a vibration pattern, and the input unit 168 or the vibration device 164 generates a vibration according to the vibration pattern. The information related to the vibration pattern may indicate the vibration pattern itself, an indicator of the vibration pattern, or the like. Alternatively, the control signal may include only a request for generating the vibration.

The first electronic device 100 may include at least one of the mobile communication module 121, the wireless LAN module 131, and the short range communication module 132 according to the performance thereof.

The mobile communication module 121 enables the first electronic device 100 to be connected with an external electronic device through mobile communication network by using one antenna or a plurality of antennas (not shown). The mobile communication module 121 transmits and receives a wireless signal for a voice call, a video call, a SMS, or a MMS to and/or from a portable phone (not shown), a smart phone (not shown), a tablet PC, or another device (not shown) having a phone number input into the first electronic device 100.

The sub-communication module 130 includes at least one of the wireless LAN module 131 and the short range communication module 132. For example, the sub-communication module 130 may include only the wireless LAN module 131, only the short range communication module 132, or both the wireless LAN module 131 and the short range communication module 132.

The wireless LAN module 131 may be connected to the Internet via a wireless AP (not shown) is installed. The wireless LAN module 131 supports a wireless LAN standard of the Institute of Electrical and Electronics Engineers (IEEE) such IEEE 802.11n or IEEE 802.11ac. The short range communication module 132 may wirelessly perform short range communication between the first electronic device 100 and an external electronic device, under a control of the controller 110. A communication scheme (or communication protocol) of the wireless LAN module 131 and the short range communication module 132 may include a Bluetooth communication scheme, an Infrared Data Association (IrDA) communication scheme, a WiFi communication scheme, a WiFi-Direct communication scheme, a NFC scheme or the like. The NFC communication scheme corresponds to an example of a magnetic field communication scheme.

The broadcasting communication module 141 can receive a broadcasting signal (for example, a TV broadcasting signal, a radio broadcasting signal, or a data broadcasting signal) and broadcast of supplemental information (for example, Electronic Program Guide (EPG) or Electronic Service Guide (ESG)) from a broadcasting station through a broadcasting and communication antenna (not shown).

The multimedia module 140 may include the audio reproduction module 142 or the video reproduction module 143. The audio reproduction module 142 can reproduce a digital audio file (for example, a multimedia file having a file extension of mp3, wma, ogg, or wav) which is stored or received in the storage unit 175. The video reproduction module 143 can reproduce a received or stored digital video file (for example, a multimedia file having a file extension of mpeg, mpg, mp4, avi, mov, or mkv) stored or received. The video reproduction module 143 can also reproduce the digital audio file.

The multimedia module 140 may be integrated into the controller 110.

The camera module 150 includes at least one of the first camera 151 and the second camera 152 for photographing a still image or a video. Further, the camera module 150 may include at least one of the barrel 155 that performs a zoom-in/out operation for photographing the subject, the motor 154 for controlling a motion of the barrel 155, and the flash 153 for providing an auxiliary light for photographing the subject. The first camera 151 may be disposed on a front surface of the first electronic device 100, and the second camera 152 may be arranged on a rear surface of the first electronic device 100.

Each of the first and second cameras 151 and 152 may include a lens system, an image sensor and the like. The first and second cameras 151 and 152 convert an optical signal input (or photographed) through the lens system to an electric image signal (or digital image), and output the converted image signal to the controller 110. Thus, the user can photograph a video or a still image through the first and second cameras 151 and 152.

The input/output module 160 includes at least one button 161, at least one microphone 162, at least one speaker 163, at least one vibration device 164, the connector 165, the keypad 166, the earphone connection jack 167, and the input unit 168. The input/output module 160 is not limited thereto, and a mouse, a trackball, a joystick, or a cursor control such as cursor direction keys may be provided for controlling a motion of a cursor on the touch screen 190.

The button 161 may be formed on a front surface, a side surface, or a rear surface of the housing (or case) of the first electronic device 100, and may include at least one of an electric power/lock button, a volume control button, a menu button, a home button, a back button, and a search button.

The microphone 162 receives a voice or a sound to generate an electrical signal according to a control of the controller 110.

The speaker 163 may output sounds corresponding to various signals or data (for example, wireless data, broadcasting data, digital audio data, digital video data or the like) to the external environment of the first electronic device 100, under a control of the controller 110. The speaker 163 may output a sound (for example, button tone corresponding to phone communication, ringing tone, and a voice of another user) corresponding to a function performed by the first electronic device 100. One speaker 163 or a plurality of speakers 163 may be arranged at any suitable position or positions of the housing of the first electronic device 100.

The vibration device 164 can convert an electrical signal to a mechanical vibration under a control of the controller 110. For example, when the first electronic device 100 is placed in a vibration mode and receives a voice call or a video call from another device (not shown), the vibration device 164 operates to provide a vibration. One or more vibration devices 164 may be arranged in the housing of the first electronic device 100. The vibration device 164 can operate in correspondence to a user input through the touch screen 190.

The connector 165 may be used as an interface for connecting the first electronic device with an external electronic device or an electric power source (not shown). The controller 110 may transmit data stored in the storage unit 175 to an external electronic device or receive data from an external electronic device through a wired cable connected to the connector 165. The first electronic device 100 may receive electric power from the electric power source through the wired cable connected to the connector 165 or charge a battery (not shown) by using the electric power source.

The keypad 166 may receive a key input from the user for the control of the first electronic device 100. The keypad 166 may include a physical keypad (not shown) arranged on the first electronic device 100 or a virtual keypad (not shown) displayed on the touch screen 190. The physical keypad arranged on the electronic device 100 may be excluded according to the performance or structure of the first electronic device 100.

An earphone (not shown) may be inserted into the earphone connecting jack 167 to be connected with the first electronic device 100.

The input unit 168 may be inserted and stored in the first electronic device 100, or drawn back or separated from the first electronic device 100. An attachment/detachment recognition switch 169 which operates according to the attachment and/or detachment of the input unit 168 and is located in an area that the input unit 168 is inserted. The attachment/detachment recognition switch 169 may output signals corresponding to the installation and separation of the input unit 168 to the controller 110. The attachment/detachment recognition switch 169 may be configured to directly and/or indirectly contact the input unit 168 when the input unit 168 is mounted. Accordingly, the attachment/detachment recognition switch 169 generates a signal corresponding to the attachment or the detachment (that is, a signal notifying of the attachment or the detachment of the input unit 168) based on whether the attachment/detachment recognition switch 169 is connected with the input unit 168 and then outputs the generated signal to the controller 110.

The sensor module 170 includes at least one sensor for detecting a state of the first electronic device 100. For example, the sensor module 170 may include a proximity sensor for detecting whether a user approaches the first electronic device 100, a luminance sensor (not shown) for detecting an amount of light incident to the first electronic device 100, a motion sensor (not shown) for detecting a movement of the first electronic device 100 (for example, a rotation, acceleration or vibration of the first electronic device 100), a gyroscope for detecting a rotational movement of the first electronic device 100, an accelerometer for detecting an acceleration movement of the first electronic device 100, a geo-magnetic sensor for detecting a point of a compass of the first electronic device 100 by using a magnetic field of the Earth, a gravity sensor for detecting a direction of gravity, an altimeter for measuring atmospheric pressure to detect an altitude, a GPS module 157 or the like.

The GPS module 157 may receive electric waves from a plurality of GPS satellites (not shown) in Earth's orbit and calculate a position of the first electronic device 100 by using a time of arrival from the GPS satellites to the first electronic device 100.

The storage unit 175 can store a signal or data input/output according to the operation of the communication unit 120, the multimedia module 140, the camera module 150, the input/output module 160, the sensor module 170, or the touch screen 190, under a control of the controller 110. The storage unit 175 may store a control program and applications for controlling the first electronic device 100 or the controller 110.

The term "storage unit" is used as a term which refers to a data storage device such as the storage unit 175, the ROM 112 or the RAM 113 within the controller 110, or a memory card (for example, an SD card or a memory stick) installed in the first electronic device 100. The storage unit 175 may include a non-volatile memory, a volatile memory, or a Hard Disk Drive (HDD) or a Solid State Drive (SSD).

Further, the storage unit 175 may store one or more application such as a navigation application, a video call application, a game application, or an alarm application based on time, images for providing a Graphical User Interface (GUI) relating to the application, a database or data relating to a wireless connection method, documents, background images or operation programs, e.g., a menu screen, a standby screen, and the like, necessary for an operation of the application on the portable device 100.

Furthermore, the storage unit 175 may store a program and related data for executing the wireless connection method using the Out Of Band (OOB) channel according to the present disclosure.

The storage unit 175 is for example, a computer-readable medium for providing data to the machine so that the machine performs a specific function. The storage unit 175 may include a non-volatile medium and a volatile medium and allows the commands transferred by the media to be detected by a physical instrument in which the machine reads the commands into the physical instrument.

The machine-readable medium includes, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash EPROM.

The electric power supply unit 180 may supply electric power to one or more batteries arranged in the housing of the first electronic device 100 under a control of the controller 110. The one or more batteries supply the first electronic device 100 with electric power. Further, the electric power supply unit 180 may supply electric power input from an external electric power source through a wired cable connected to the connector 165 to the first electronic device 100. In addition, the electric power supply unit 180 may supply electric power input from the external electric power source through a wireless charging technology to the first electronic device 100.

Furthermore, the first electronic device 100 may include at least one touch screen 190 providing user graphical interfaces corresponding to various services (for example, a phone call, data transmission, broadcasting, and photographing) to the user.

The touch screen 190 can output an analog signal corresponding to at least one user input which is provided to the user graphical interface, to the touch screen controller 195.

The touch screen 190 can receive at least one user input through a user's body (for example, fingers including a thumb) or the input unit 168 (for example, a stylus pen or an electronic pen).

The touch screen 190 can receive successive motions of one touch (that is, a drag input). The touch screen 190 can output an analog signal corresponding to the successive motions of the input touch to the touch screen controller 195.

The touch input is not limited to a contact between the touch screen 190 and the finger or input unit 168, and may include a noncontact such as, for example, a case where the user input means is located within a recognition distance (for example, 1 cm) where the user input means can be detected without a direct contact. A distance or interval within which the user input means may be recognized in the touch screen 190 may be changed according to the performance or the structure of the first electronic device 100. Particularly, the touch screen 190 is configured to output different values (for example, including a voltage value or a current value as an analog value) according to the touch input type so that the direct touch and the indirect touch event (that is, the hovering event) can be distinguished.

The touch screen 190 may be implemented in a resistive type, a capacitive type, an infrared type, an acoustic wave type, or a combination thereof.

Further, the touch screen 190 may include at least two touch screen panels capable of detecting a finger input and a pen input respectively, in order to distinguish the type of input. With the user input means, a classification of a passive type and an active type can be achieved according to whether energy such as electronic waves, electromagnetic waves and the like are generated or induced. The two or more touch panels provide different output values to the touch screen controller 195. Then, the touch screen controller 195 can recognize the different values input to the two or more touch panels to distinguish whether the input from the touch screen 190 is an input by the finger or an input by the input unit 168. For example, the touch screen 190 may be a combination of a capacitive typed touch screen panel and an electromagnetic resonance typed touch screen panel. Further, as described above, the touch screen 190 may include touch keys such as the menu button 161*b*, the back button 161*c* and like, and accordingly, a finger input according to the present disclosure or a finger input on the touch screen 190 includes a touch input on the touch key.

The touch screen controller 195 converts an analog signal received from the touch screen 190 to a digital signal and transmits the converted digital signal to the controller 110. The controller 110 can control the touch screen 190 by using the digital signal received from the touch screen controller 195. For example, the controller 110 allows a short-cut icon (not shown) or an object displayed on the touch screen 190 to be selected or executed in response to the direct touch event or the hovering event. Further, the touch screen controller 195 may be integrated with the controller 110.

The touch screen controller 195 can identify a hovering interval or distance as well as a position of the user input by detecting a value (for example, an electric current value or the like) output through the touch screen 190, convert the identified distance value to a digital signal (for example, a Z coordinate), and then provide the converted digital signal to the controller 110. Further, the touch screen controller 190 can detect a pressure applied to the touch screen 190 by the user input means by detecting the value (for example, the current value or the like) output through the touch screen 190, convert the identified pressure value to a digital signal, and then provide the converted digital signal to the controller 110.

Figure 2:
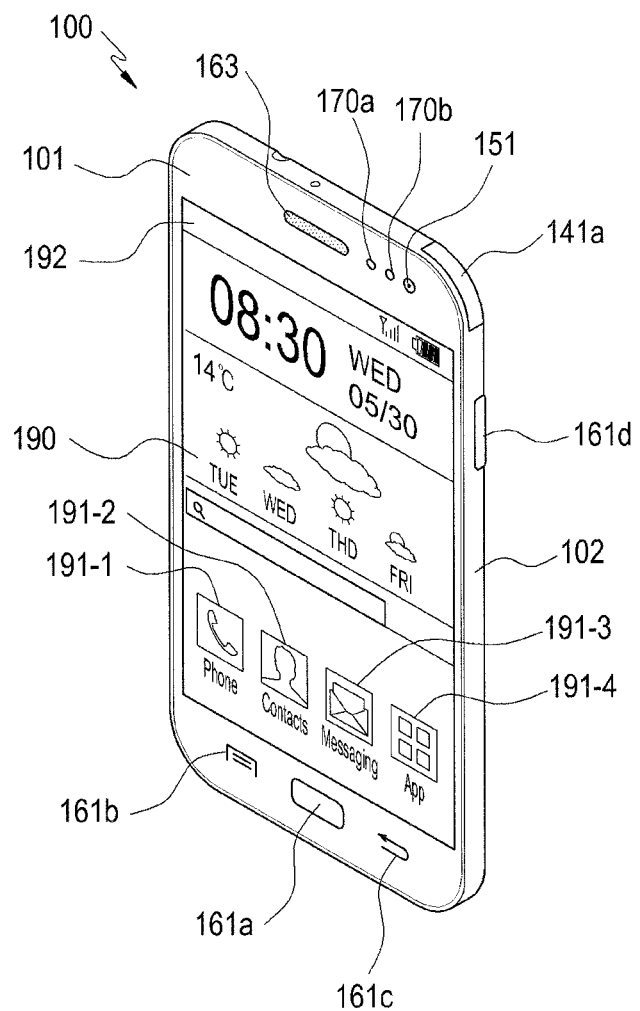
FIG. 2 is a perspective view illustrating a front surface of the first electronic device according to an embodiment of the present disclosure.
Figure 3:
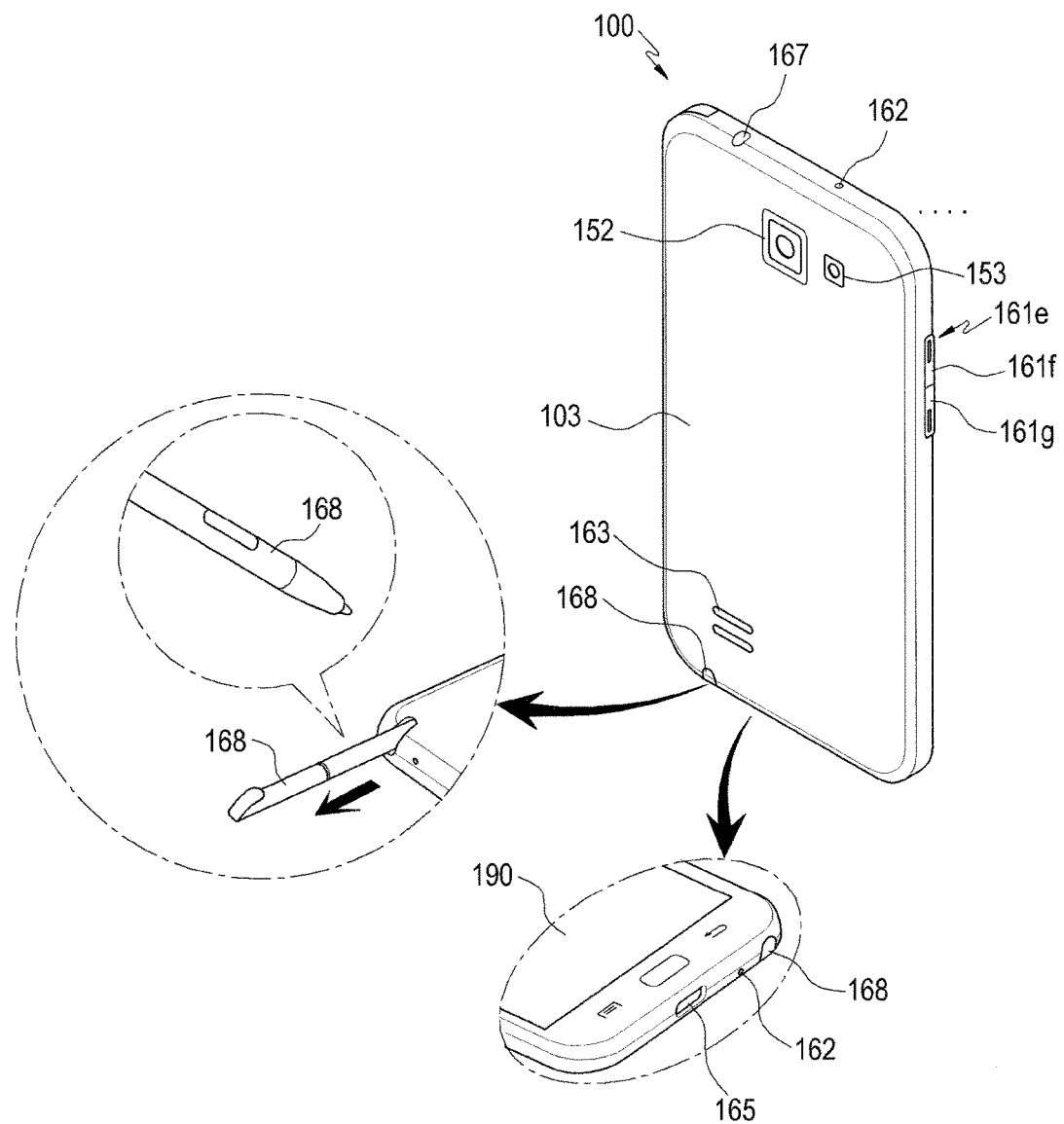
FIG. 3 is a perspective view illustrating a rear surface of the first electronic device according to an embodiment of the present disclosure.

FIG. 2 is a perspective view illustrating a front surface of the electronic device according to an embodiment of the present disclosure and FIG. 3 is a perspective view illustrating a rear surface of the electronic device according to an embodiment of the present disclosure.

Referring to FIGS. 2 and 3, the touch screen 190 is disposed at a center portion on the front surface 101 of the first electronic device 100. The touch screen 190 may have a large size to occupy most of the front surface 101 of the first electronic device 100. FIG. 2 shows an example where a main home screen is displayed on the touch screen 190. The main home screen is an initial screen that is displayed when the first electronic device 100 is turned on. Further, when the electronic device 100 includes a plurality of different home screens, the main home screen may be the first home screen among the plurality of pages of home screens. Short-cut icons 191-1, 191-2, and 191-3 for executing frequently used applications, a main menu switching key 191-4, time, weather and the like may be displayed on the home screen. When the user selects the main menu switching key 191-4, the menu screen is displayed on the touch screen 190. Further, a status bar 192 which displays the status of the first electronic device 100 such as a battery charging status, a received signal intensity, and a current time may be arranged on an upper end of the touch screen 190.

The touch keys such as the home button 161a, the menu button 161b, the back button 161c and the like, mechanical keys, or a combination thereof may be arranged at a lower portion of the touch screen 190. Further, the touch keys may be constituted as a part of the touch screen 190.

The home button 161a displays the main home screen on the touch screen 190. For example, when the home button 161a is selected, the main home screen may be displayed on the touch screen 190. Further, when the home button 161a is selected while applications are executed on the touch screen 190, the main home screen shown in FIG. 2 may be displayed on the touch screen 190. In addition, the home button 161a may be used to display recently used applications or a task manager on the touch screen 190.

The menu button 161b provides a connection menu which can be displayed on the touch screen 190. The connection menu includes a widget addition menu, a background screen changing menu, a search menu, an editing menu, an environment setting menu and the like.

The back button 161c may be used for displaying the screen which was executed just before the currently executed screen or terminating the most recently used application.

The first electronic device 100 may have the first camera 151, the luminance sensor 170a and the proximity sensor 170b arranged on an upper side of the front surface 101 thereof. Referring to FIG. 3, the first electronic device 100 may have the second camera 152, the flash 153 and the speaker 163 which are disposed on the rear surface 103 thereof.

Referring to both FIGS. 2 and 3, an electric power/lock button 161d, volume buttons 161e having a volume increase button 161f and a volume decrease button 161g, a terrestrial DMB antenna 141a for broadcasting reception, and one or a plurality of microphones 162 may be disposed on a side surface 102 of the first electronic device 100. The DMB antenna 141a may be fixed to the first electronic device 100 or may be mounted to be detachable from the first electronic device 100.

Further, the connector 165 is arranged on a side surface of a lower end of the first electronic device 100. A plurality of electrodes is formed in the connector 165, and the connector 165 may be connected to an external device by a wire. The earphone connecting jack 167 may be arranged on an upper side surface of the first electronic device 100. An earphone may be inserted into the earphone connecting jack 167.

Further, the first electronic device 100 has the input unit 168 which is inserted therein through a side surface of a lower end thereof. The input unit 168 may be inserted and stored in the first electronic device 100, or drawn back or separated from the first electronic device 100 when it is used.

The controller 110 controls whole operations of the first electronic device 100, and also controls structural elements in the first electronic device 100 to perform the wireless connection method using an out of band channel.

Figure 4:
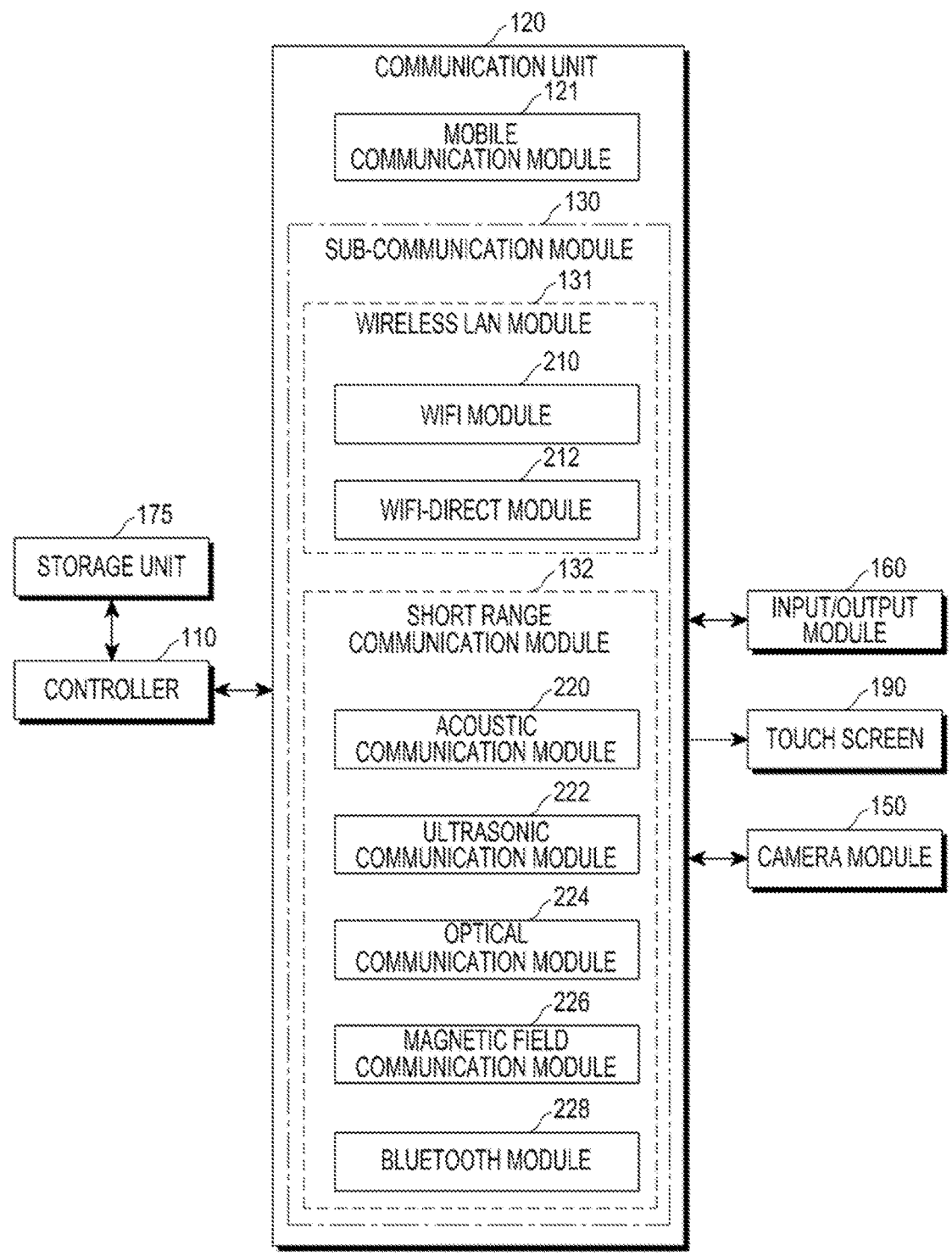
FIG. 4 is a block diagram of the first electronic device for performing a wireless connection method using an out of band channel according to an embodiment of the present disclosure.

FIG. 4 is a block diagram of the first electronic device for performing the wireless connection method using the out of band channel according to an embodiment of the present disclosure.

The communication unit 120 includes the mobile communication module 121 for performing cellular communication or mobile communication using a third or fourth generation communication scheme, and the sub-communication module 130 for carrying out wireless LAN communication and short range communication. The sub-communication module 130 includes the wireless LAN module 131 and the short range communication module 132. The mobile communication module 121 may be referred to as a cellular communication module.

The wireless LAN module 131 may include the WiFi module 210 for carrying out WiFi communication using the antenna and the WiFi Direct module 212 for performing WiFi direct communication using the antenna.

The short range communication module 132 includes an acoustic communication module 220 for performing acoustic communication using a speaker 163 and a microphone 162 of the input/output module 160, an ultrasonic communication module 222 for performing ultrasonic communication using the speaker 163 and the microphone 162 of the input/output module 160, an optical communication module 224 for performing optical communication using a light source such as a flash 153 or the touch screen 190 and a light receiving unit such as the camera module 150, a magnetic field communication module 226 for performing magnetic field communication using the antenna, and the Bluetooth module 228 for performing Bluetooth communication using the antenna. An infrared ray, a visible ray or the like may be used for the optical communication.

The controller 110 transmits or receives content data such as a text, an audio file or an image (stationary image or video), or wireless connection data through a main wireless channel (or referred to as a main wireless communication channel) provided by the sub-communication module 130 or the mobile communication module 121. The controller 100 transmits or receives hash data through the out of band channel provided by the sub-communication module 130 or the mobile communication module 121. The out of band channel is used not for the transmission of the content data but for the transmission of the wireless connection data. The main wireless channel and the out of band channel may be provided through different communication schemes or provided to be distinguished from each other even in the same communication scheme (by using different frequencies, different data formats, or the like). The out of band channel and the main wireless channel may use an identical scheme or different schemes among the acoustic communication scheme, the ultrasonic communication scheme, the optical communication scheme, the magnetic field communication scheme, the Bluetooth communication scheme, the WiFi communication scheme, the WiFi-Direct communication scheme, and the cellular communication scheme (i.e., third or fourth generation mobile communication scheme). Alternatively, the out of band channel may be provided by using one of the acoustic communication scheme, the ultrasonic communication scheme, the optical communication scheme and the magnetic field communication scheme, and the main wireless channel may be provided by using one of the Bluetooth communication scheme, the WiFi communication scheme and the WiFi-Direct communication scheme.

The controller 110 receives a second hash value from a second electronic device located near the first electronic device 100 through the out of band channel and stores the received second hash value.

Further, the controller 110 may calculate a first hash value of first device identification information on the first electronic device 100, and transmit the first calculated hash value to the second electronic device in the storage unit 175.

The controller 110 receives second device identification information of the second electronic device from the second electronic device through the main wireless channel. The controller 110 calculates a third hash value of the second device identification information, and compares the third hash value with the second hash value. If the values are identical, the controller 110 establishes the wireless connection with the second electronic device.

Furthermore, as having transmitted the first device identification information of the first electronic device 100 through the main wireless channel and received a request for a wireless connection from the second electronic device, the controller 110 may establish the wireless connection with the second electronic device in response to the request of the wireless connection.

Figure 5:
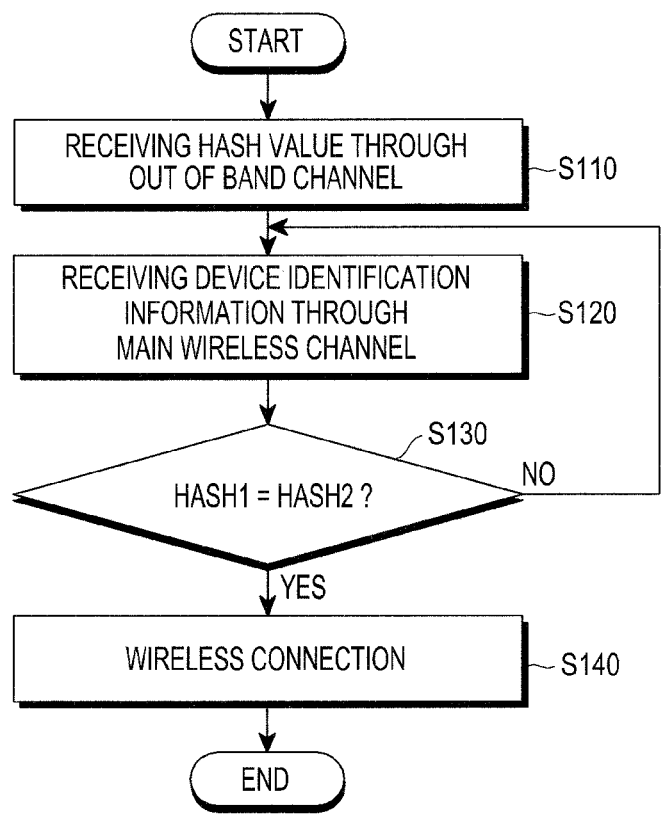
FIG. 5 is a flowchart illustrating a wireless connection method using an out of band channel according to a first embodiment of the present disclosure.
Figure 6:
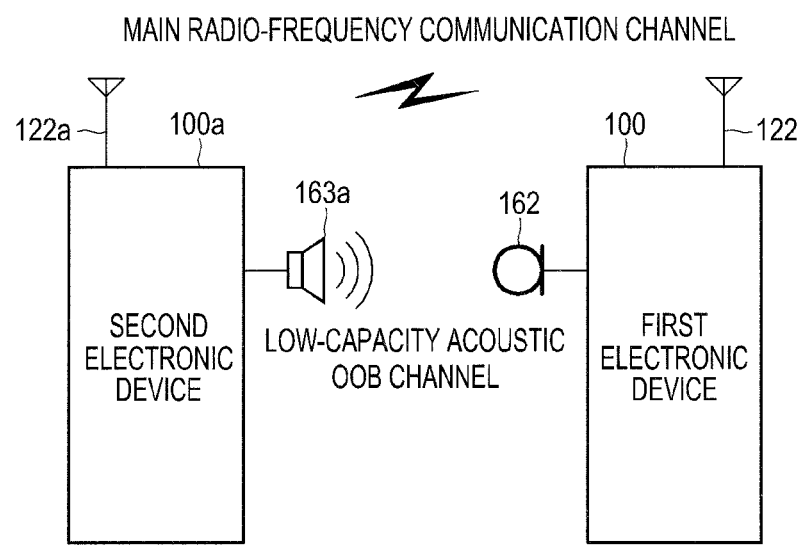
FIG. 6 is a schematic view illustrating the wireless connection method using the out of band channel according to an embodiment of the present disclosure.

FIG. 5 is a flowchart illustrating the wireless connection process using the out of band channel according to the first embodiment of the present disclosure and FIG. 6 is a schematic view illustrating the wireless connection process using the out of band channel according to an embodiment of the present disclosure.

Referring to FIG. 6, the second electronic device 100*a* has a structure similar to that of the first electronic device 100 shown in FIG. 1.

The wireless connection process using the out of band channel includes operations S110, S120, S130 and S140.

Referring to FIG. 5, in operation S110, the first electronic device 100 receives the hash value from the second electronic device 100*a* through the out of band channel. The second electronic device 100*a* calculates a first hash value HASH1 of device identification information and transmits the first calculated hash value to the first electronic device 100 through the out of band channel. In this embodiment, the second electronic device 100*a* uses the out of band channel in the acoustic communication scheme, and transmits acoustic waves modulated with the first hash value by using the speaker 163*a*. The device identification information includes at least one of various pieces of information such as a network address (device address, a Media Access Control (MAC) address, a MAC address of an access point, a Basic Service Set Identifier (BSSID), or the like), a device identifier (a device name, a Service Set Identifier (SSID) or the like), authorization information (a Personal Identification Number (PIN), a shared secret key, a pairing key, a network key or the like), authorization information/encryption type, a type of device and the like. The second electronic device 100*a* inputs the network address and the device identifier into a hash function, so as to calculate the first hash value. The hash function outputs data with a fixed length, for example, 8 bits, regardless of a length of input data, for example, 56~304 bits. For example, by substituting the device identification information of 56~304 bits with the hash value of 8 bits, the amount of data to be transmitted through the out of band channel can be reduced by 85~97%.

The hash function may be a certain algorithm or subroutine for mapping (compressing or converting) data with a variable length (or a large amount of data sets) to data with a fixed length (or a small amount of data sets).

For example, a non-cryptographic hash function such as a Cyclic Redundancy Check (CRC) function, a Pearson hashing function, an Object.GetHashCode( ) or the like may be used as the hash function. Alternatively, a cryptographic hash function such as MD5, SHA-1, SHA512 or the like may be used as the hash function. In this embodiment, the second electronic device 100*a* inputs the MAC address and the SSID into the CRC function and calculates the first hash value.

The first electronic device 100 receives acoustic waves through the microphone 162, extracts the first hash value from the acoustic waves, and stores the first hash value in the storage unit 175.

In operation S120, the second electronic device 100*a* broadcasts the device identification information through the main wireless channel by using the antenna 122*a*, and the first electronic device 100 receives the device identification information of the second electronic device 100*a* by scanning a surrounding electronic device. In this embodiment, the second electronic device 100*a* uses the main wireless channel of the WiFi or WiFi-Direct scheme and transmits a signal that includes the device identification information using the antenna 122*a*. The first electronic device 100 receives the signal through the antenna 122, extracts the device identification information, and stores the device identification information in the storage unit 175.

In operation S130, the first electronic device 100 calculates a second hash value HASH2 of the device identification information and compares the second hash value HASH2 with the first hash value HASH1. The first electronic device 100 performs operation S140 if the first and second hash values are identical, while returning to operation S120 if the first and second hash values are not identical. In this embodiment, the first electronic device 100 extracts the MAC address and the SSID from the device identification information of the second electronic device 100*a*, and inputs the extracted MAC address and the SSID into the CRC function to calculate the second hash value.

In operation S140, in the case that the first and second hash values are identical, the first electronic device 100 requests the second electronic device 100*a* to permit the wireless connection through the main wireless channel, and the second electronic device 100*a* responds to the request of the first electronic device 100 for the wireless connection, thereby performing the wireless connection between the first and second electronic devices 100 and 100*a*. A message for requesting the wireless connection which the first electronic device 100 transmits to the second electronic device 100*a* may include the device identification information of the first electronic device 100, which may include at least one of various pieces of information such as a network address, the device identifier, authorization information, an authorization information/encryption type, a type of device, and the like.

After the wireless connection is formed, the first and second electronic devices 100 and 100*a* can transmit and receive content data to and from each other through the main wireless channel.

After transmitting the first hash value to the first electronic device 100, the second electronic device 100*a* can automatically broadcast the device identification information. The user input includes a gesture input through the camera module, a switch/button input through the input/output module, a voice input as well, or a user input through the touch screen. Further, the user input includes an operation in which a user enables the second electronic device 100*a* to be close in proximity to the first electronic device 100, or causes the second electronic device 100*a* to contact the first electronic device 100.

In this embodiment, although it is described that the first electronic device 100 receives the device identification information of the second electronic device 100*a* after receiving the first hash value, the first electronic device 100 may receive the first hash value from the first electronic device 100 after receiving the device identification information of the second electronic device 100*a*. In this case, the first electronic device 100 can calculate the second hash value of the device identification information before or after receiving the first hash value.

In order to minimize consumption of electric power, the module for providing the main wireless channel, for example, the wireless LAN module or the Bluetooth module, may be in an inactive state. Then, the first electronic device 100 may activate the corresponding module after receiving the first hash value. Here, the inactive state refers to a state in that the corresponding module is configured to not receive external signals or to not transmit signals.

Figure 7:
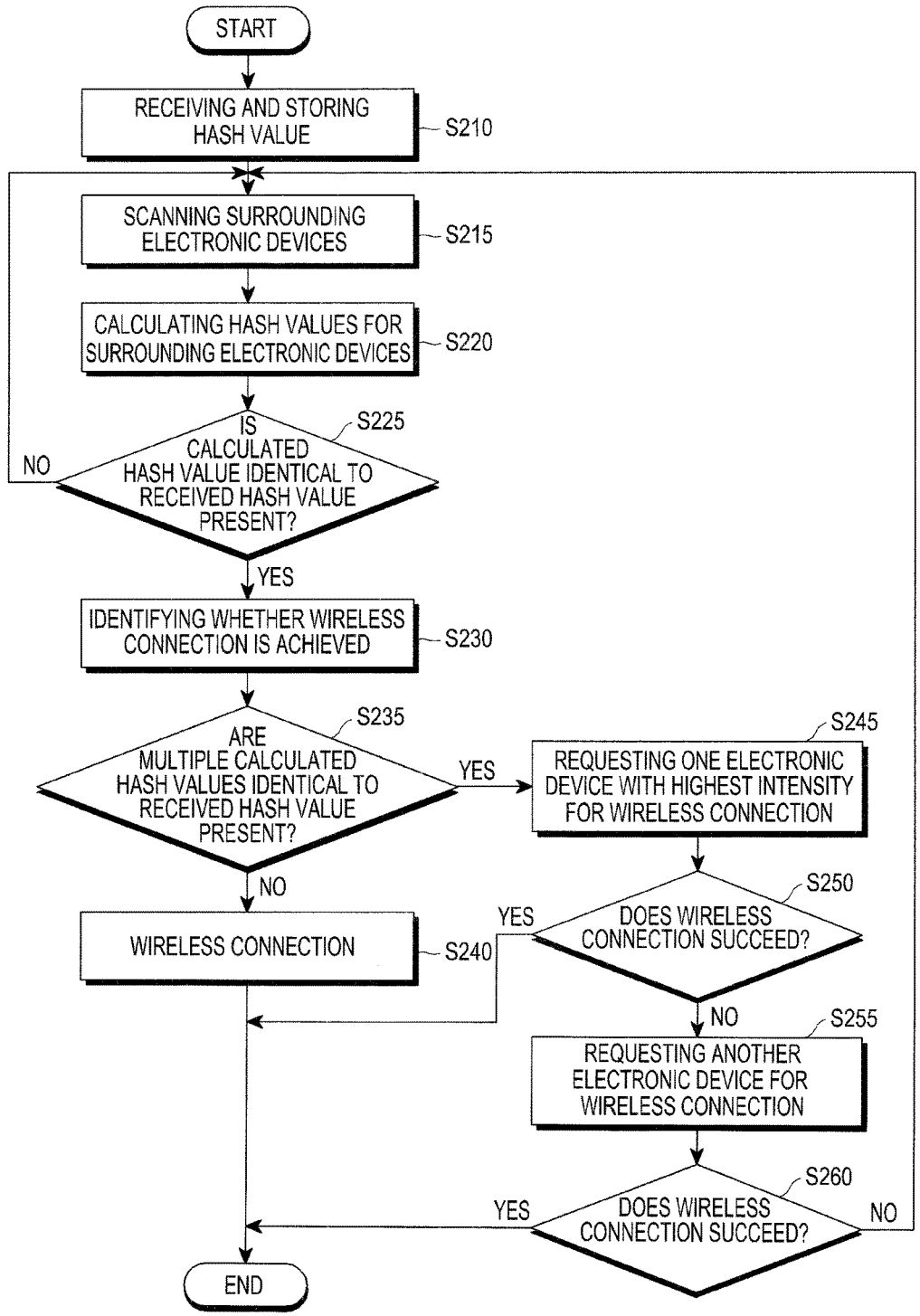
FIG. 7 is a flowchart illustrating a wireless connection method using an out of band channel according to a second embodiment of the present disclosure.
Figure 8:
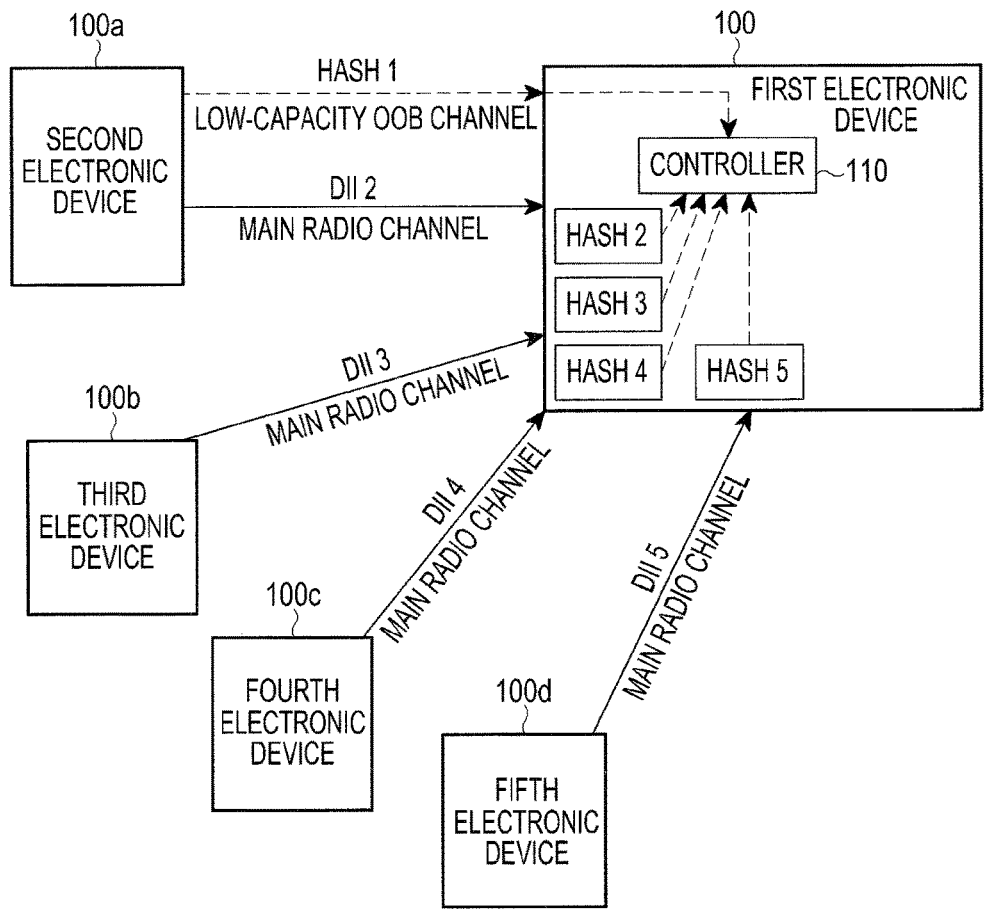
FIG. 8 is a schematic view illustrating the wireless connection method using the out of band channel according to an embodiment of the present disclosure.

FIG. 7 is a flowchart illustrating the wireless connection process using the out of band channel according to an embodiment of the present disclosure and FIG. 8 is a schematic view illustrating the wireless connection process using the out of band channel according to an embodiment of the present disclosure.

In operation S210, the first electronic device 100 receives the hash value from the second electronic device 100a through the out of band channel and stores the hash value. The second electronic device 100a calculates the first hash value HASH1 of the device identification information and transmits the first calculated hash value to the first electronic device 100 through the out of band channel.

The first electronic device 100 receives and stores the first hash value through the out of band channel.

Figure 9:
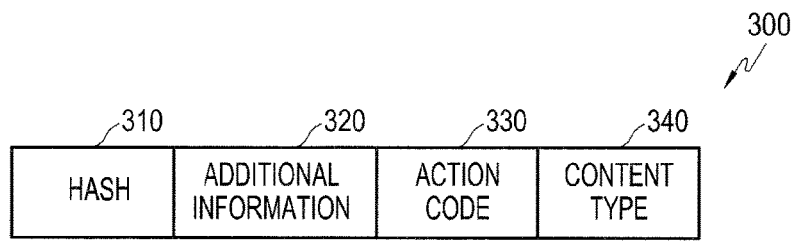
FIG. 9 is a view illustrating a frame structure of a message for transmitting a first hash value according to an embodiment of the present disclosure.

FIG. 9 is a view illustrating a frame structure of a message for transmitting a first hash value according to an embodiment of the present disclosure.

Referring to FIG. 9, the hash transmission message 300 of the WiFi-Direct scheme may have an entire length of 38 bits and include a 16 bit hash field 310 with a hash value of the MAC address, an additional information field 320 with additional information, an 2 bit action code field 330 with an action code value which indicates a WiFi-Direct pairing (a value of "00") or an execution of a certain application (a value of "10") and so forth, a content type field 340 with a content type value which indicates a content type such as a photograph (a value of "00"), music (a value of "01") or the like.

In operation S215, a second, third, fourth and fifth electronic devices 100a, 100b, 100c and 100d placed in proximity to the first electronic device 100 respectively broadcast identification information DII2, DII3, DII4 and DII5 through the main wireless channel. The first electronic device 100 receives the identification information of the second, third, fourth and fifth electronic devices through a process of scanning for electronic devices.

In operation S220, the first electronic device 100 calculates the second, third, fourth and fifth hash values HASH2, HASH3, HASH4 and HASH5 for the identification information of the second, third, fourth and fifth devices, respectively.

In operation S225, the first electronic device 100 compares the first hash value with each of the second, third, fourth and fifth hash values. If one of the second, third, fourth and fifth hash values is identical to the first hash value, the first electronic device 100 performs operation S230, while if not, the first electronic device 100 returns to operation S215.

In operation S230, the first electronic device 100 identifies whether a user is able to perform the wireless connection. For example, the first electronic device 100 displays a window for identifying whether it is able to perform the wireless connection with another electronic device on the touch screen 190 and may perform operation S235 if the user selects a confirmation button on the identification window. If the user selects the identification button of the identification window, the process may be finished. Alternatively, the first electronic device 100 may display only a message of informing the user of the wireless connection with another electronic device. In other examples, operation S230 may be omitted, may be performed just after operation S210, or may be performed before or after operations S240, S250, or S260.

In operation S235, the first electronic device 100 determines if there are multiple calculated hash values identical to the received has value. If there are not multiple calculated hash values identical to the received has value, the first electronic device 100 performs operation S240. On the other hand, if there are plural hash values identical to the first hash value, the first electronic device 100 performs operation S245.

In the case of an 8 bit hash value, probability P in that two identical hash values cause a collision by having an identical value can be calculated by Equation (1).

$$P=1/2^8=0.0039 \qquad \text{Equation (1)}$$

Accordingly, if n number of electronic devices around the first electronic device 100 is present, probability Pn can be calculated by Equation (2).

$$P_n \approx 1-(1-1/256)^n \qquad \text{Equation (2)}$$

For example, if ten peripheral electronic devices are present, the probability Pn of collision is 0.038, while if twenty peripheral electronic devices are present, the probability Pn of collision is 0.075.

In the present embodiment, if a plurality of electronic devices include identical hash values, a method of attempting the wireless connection in sequence of intensity of received signals is proposed.

In operation S240 of the wireless connection, the first electronic device 100 requests an electronic device, which has the hash value identical to the first hash value, for the wireless connection through the main wireless channel, and the corresponding electronic device responds to the request for the wireless connection of the first electronic device 100 so that the first electronic device 100 is wirelessly connected to the corresponding electronic device.

In operations S245 to 260, if a plurality of hash values identical to the first hash value is present, the wireless connections are attempted in a sequence based on the intensity of the signals. In the present embodiment, two hash values identical to the first hash value are illustrated. Referring back to operation S215, the first electronic device 100 may also measure the intensity (or Received Signal Strength Indicator (RSSI)) of the received signals of the main wireless channel for each electronic device when the surrounding electronic devices 100a, 100b, 100c and 100d are scanned. In operation S245, the first electronic device 100 attempts the wireless connection with the electronic device having the highest intensity of the received signal from the surrounding electronic devices that have hash values identical to the first hash value.

In operation S250, the first electronic device 100 finishes the present process if the wireless connection with the surrounding electronic device with the highest intensity of the received signal occurs. However, the first electronic device 100 performs operation S255 if the wireless connection fails. In operation S255, the first electronic device 100 requests a surrounding electronic device with the next highest intensity of the received signal for the wireless connection. As the surrounding electronic device responds to the request for the wireless connection of the first electronic device 100, the first electronic device 100 is wirelessly connected to another electronic device. In operation S260, if the first electronic device 100 succeeds in the wireless connection, the first electronic device 100 finishes the present process, while returning to operation S215 if the wireless connection fails.

After the wireless connection, the first electronic device 100 and surrounding electronic device can transmit and receive content data to/from each other through the main wireless channel.

Meanwhile, a communication scheme providing the out of band channel is preset, or may be automatically set.

Referring to FIG. 4, the sub-communication module 130 may be partially deactivated unless the user activates the modules. Accordingly, in the case that the preset out of band channel is used, the wireless connection can be performed if the corresponding module of the companion electronic device is inactive.

Referring back to FIG. 5, in operation S110, the second electronic device 100*a* identifies whether the received signal is present in the available out of band channel and may transmit the first hash value through the out of band channel in which the received signal is present. For example, the second electronic device 100*a* determines whether a Bluetooth signal is received through the Bluetooth module, and may transmit the first hash value through the out of band channel in a Bluetooth scheme if the Bluetooth signal is received. Then, as the second electronic device 100*a* transmits the first hash value, the first electronic device activates the WiFi-Direct module 212 thereof. Accordingly, the first electronic device 100 can transmit and receive the content data to and from the second electronic device 100*a* through the main wireless channel in the WiFi-Direct scheme.

Although the touch screen has been illustrated as a representative example of the display unit displaying the screen in the above-described embodiments, a general display unit, such as a Liquid Crystal Display (LCD), an Organic Light Emitting Diode (OLED), and a Light Emitting Diode (LED), which do not have a touch detection function may also be used.

According to the present disclosure, a wireless connection process can be rapidly and simply established by using the out of band channel with low capacity.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is appreciated that the storage unit included in the electronic device is one example of a program including commands for implementing various embodiments of the present disclosure or a machine-readable storage medium suitable for storing programs. Therefore, various embodiments of the present disclosure provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present disclosure properly includes the things equivalent to that.

Further, the electronic device may receive the program from a program providing apparatus connected to the electronic device wirelessly or through a wire and store the received program. The program providing device may include a program having instructions which enable the electronic device to perform a method of controlling to display the objects, a memory for storing information necessary for an implementation of the method of controlling to display the object, a communication unit for performing wired or wireless communication with the electronic device, and a controller for transmitting a corresponding program to another portable device automatically or in response to a request of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of wirelessly connecting to a plurality of electronic devices by a first electronic device, the method comprising:
   receiving, from at least one of a plurality of surrounding electronic devices in proximity to the first electronic device, by the first electronic device, a first hash value through a first channel;
   receiving, by the first electronic device, a plurality of device identifiers of the plurality of surrounding electronic devices through a second channel;
   calculating, by the first electronic device, a plurality of hash values from the plurality of device identifiers;
   identifying, by the first electronic device, a second electronic device from the plurality of surrounding electronic devices based on a comparison of the first hash value and the plurality of hash values; and
   performing, by the first electronic device, a wireless connection with the second electronic device.

2. The method of claim 1, wherein the second channel is provided by one of a Bluetooth communication scheme, a WiFi communication scheme, a WiFi-Direct communication scheme, or a cellular communication scheme.

3. The method of claim 1, wherein the plurality of hash values are calculated by a hash function of mapping a relatively large amount of data sets with a variable length with a relatively small amount of data sets with a fixed length.

4. The method of claim 1, wherein the performing of the wireless connection of the first electronic device comprises activating a communication module.

5. The method of claim 4, wherein the communication module is in an inactive state before the activating and is configured to transmit information through the second channel.

6. The method of claim 1, wherein the first channel is an out of band channel and the second channel is a main wireless channel.

7. The method of claim 1,
   wherein the first channel is an acoustic channel, and
   wherein the second channel is an electromagnetic channel.

8. The method of claim 7,
   wherein a microphone is configured to receive the acoustic channel, and
   wherein a communication module is configured to receive the electromagnetic channel.

9. A non-transitory computer-readable storage medium with instructions stored therein which upon execution cause at least one processor to:
   receive, from a second electronic device from among a plurality of surrounding electronic devices in proximity to a first electronic device, by the first electronic device, a first hash value through a first channel;

receive, by the first electronic device, a plurality of device identifiers of the plurality of surrounding electronic devices through a second channel;

calculate, by the first electronic device, a plurality of hash values of the plurality of device identifiers; and perform, by the first electronic device, a wireless connection with the second electronic device from among the plurality of surrounding electronic devices corresponding to a hash value identical to the first hash value from among the plurality of hash values, wherein, if two or more of the surrounding electronic devices corresponding to the hash value identical to the first hash value are determined to be within proximity, the first electronic device connects to a surrounding electronic device, from among the two or more of the surrounding devices, which corresponds to a strongest received signal.

10. The non-transitory computer-readable storage medium of claim 9, wherein the second channel is provided by one of a Bluetooth communication scheme, a WiFi communication scheme, a WiFi-Direct communication scheme, or a cellular communication scheme.

11. The non-transitory computer-readable storage medium of claim 9, wherein the plurality of hash values are calculated by a hash function of mapping a relatively large amount of data sets with a variable length with a relatively small amount of data sets with a fixed length.

12. The non-transitory computer-readable storage medium of claim 9, wherein the performing of the wireless connection of the first electronic device comprises activating a communication module.

13. The non-transitory computer-readable storage medium of claim 12, wherein the communication module is in an inactive state before the activating and is configured to transmit information through the second channel.

14. The non-transitory computer-readable storage medium of claim 9, wherein the first channel is an out of band channel and the second channel is a main wireless channel.

15. A first electronic device comprising:
a storage unit configured to store data; and
a processor configured to:
receive, from a second electronic device from among a plurality of surrounding electronic devices in proximity to the first electronic device, a first hash value through a first channel,
in response to the receiving of the first hash value, receive a plurality of device identifiers of the plurality of surrounding electronic devices through a second channel,
calculate a plurality of hash values of the plurality of device identifiers, and
perform a wireless connection with the second electronic device from among the plurality of surrounding electronic devices corresponding to a hash value identical to the first hash value from among the plurality of hash values,
wherein, if two or more of the surrounding electronic devices corresponding to the hash value identical to the first hash value are present, the first electronic device is connected to a surrounding electronic device, from among the two or more of the surrounding electronic devices, which corresponds to a strongest received signal.

16. The first electronic device of claim 15, wherein the second channel is provided by one of a Bluetooth communication scheme, a WiFi communication scheme, a WiFi-Direct communication scheme, or a cellular communication scheme.

17. The first electronic device of claim 15, wherein, when receiving the first hash value through the first channel, the processor is further configured to activate a transceiver for providing the second channel.

18. The first electronic device of claim 15, wherein the processor is further configured to transmit and receive content data to/from the second electronic device through the second channel.

19. The first electronic device of claim 15, wherein the plurality of hash values are calculated by a hash function of mapping a relatively large amount of data sets with a variable length with a relatively small amount of data sets with a fixed length.

20. The first electronic device of claim 15, wherein the first channel is an out of band channel and the second channel is a main wireless channel.

* * * * *